US012676131B1

(12) United States Patent
Goldstein

(10) Patent No.: US 12,676,131 B1
(45) Date of Patent: Jul. 7, 2026

(54) SYSTEM FOR PRESENTING GRAPHICALLY ORGANIZED AND RHYTHMICALLY ALIGNED SONG INFORMATION

(71) Applicant: Ian I. Goldstein, Milton, MA (US)

(72) Inventor: Ian I. Goldstein, Milton, MA (US)

( * ) Notice: Subject to any disclaimer, the term of this patent is extended or adjusted under 35 U.S.C. 154(b) by 988 days.

(21) Appl. No.: 17/894,971

(22) Filed: Aug. 24, 2022

Related U.S. Application Data

(60) Provisional application No. 63/236,827, filed on Aug. 25, 2021.

(51) Int. Cl.
*G10H 1/00* (2006.01)

(52) U.S. Cl.
CPC ..... *G10H 1/0008* (2013.01); *G10H 2220/011* (2013.01)

(58) Field of Classification Search
CPC ....................... G10H 1/0008; G10H 2220/011
USPC ........................................................... 84/609
See application file for complete search history.

(56) References Cited

U.S. PATENT DOCUMENTS 5,506,370 A * 4/1996 Nakai .................. H04N 9/8715 84/645
RE37,131 E * 4/2001 Mankovitz ............. H04H 20/34 455/66.1
7,915,511 B2 * 3/2011 Korst ................... G10H 1/0008 84/610
8,304,642 B1 * 11/2012 Bryan .................. G10H 1/0066 84/601
8,497,416 B2 * 7/2013 Gregson .................. G10G 1/00 84/649
8,697,974 B1 * 4/2014 Fajardo .................. G09B 15/00 84/477 R
10,083,622 B1 * 9/2018 Keeney ................ G09B 15/004
10,262,638 B2 * 4/2019 Rodriguez ............... G10H 1/20
11,086,586 B1 * 8/2021 Bernett ................... G06F 3/147
11,880,507 B1 * 1/2024 Choi ....................... G06F 3/016
12,293,072 B1 * 5/2025 Walecka .................. G10H 1/38
2003/0094091 A1 * 5/2003 Brinkman .............. G06Q 20/00 84/609
2003/0192424 A1 * 10/2003 Koike .................. G09B 15/023 84/477 R
2008/0053294 A1 * 3/2008 Craig .................. G10H 1/0008 84/609
2010/0050853 A1 * 3/2010 Jean ....................... G10H 1/365 84/609
2010/0294112 A1 * 11/2010 Asakura ................. G10H 1/368 84/613

(Continued)

FOREIGN PATENT DOCUMENTS

EP 2251871 A1 * 11/2010 ............. G11B 27/11

*Primary Examiner* — Christina M Schreiber
(74) *Attorney, Agent, or Firm* — Paul D. Sorkin

(57) ABSTRACT

A system for graphically organizing a song's lyrics to the song's timing and chords, separate from the poetic phrasing of the lyrics, is provided. The lyrics are entered and manipulated with respect to the song's timing via a graphical display. Chords can be added at specific locations within the lyrics, including within a line and within a word. The arrangement of the lyrics, chords and timing are graphically presented with respect to measures of the song. Subsequently, a user can change the location of the lyrics as between one measure and another, as well as move or add chords. The system will represent the arrangement as the changes are made on a graphical display.

20 Claims, 15 Drawing Sheets

(56) References Cited

U.S. PATENT DOCUMENTS

| | | | | |
|---|---|---|---|---|
| 2010/0300267 | A1* | 12/2010 | Stoddard | G10H 1/368<br>84/610 |
| 2010/0304812 | A1* | 12/2010 | Stoddard | A63F 13/46<br>463/7 |
| 2011/0239845 | A1* | 10/2011 | Gregson | G10G 1/00<br>84/477 R |
| 2014/0174279 | A1* | 6/2014 | Wong | G10H 1/0025<br>84/609 |
| 2015/0053067 | A1* | 2/2015 | Goldstein | G09B 15/023<br>84/609 |
| 2015/0188958 | A1* | 7/2015 | Juristovski | G10H 1/365<br>715/780 |
| 2015/0206521 | A1* | 7/2015 | Sexton | G10H 3/146<br>84/609 |
| 2018/0322854 | A1* | 11/2018 | Ackerman | G06N 7/01 |
| 2018/0357548 | A1* | 12/2018 | Nichols | G06N 5/04 |
| 2018/0366097 | A1* | 12/2018 | Sharp | G10H 1/361 |
| 2021/0312897 | A1* | 10/2021 | Ackerman | G11B 27/031 |
| 2022/0248187 | A1* | 8/2022 | Reese | H04L 51/046 |
| 2023/0419930 | A1* | 12/2023 | Zhang | G10H 1/0025 |
| 2024/0152245 | A1* | 5/2024 | Broughton | G06F 3/013 |
| 2024/0207735 | A1* | 6/2024 | Zhou | A63F 13/215 |
| 2025/0104673 | A1* | 3/2025 | Margulici | G10G 1/02 |

* cited by examiner

"The Only Living Boy in New York"
Simon & Garfunkel
*Bridge over Troubled Water* (1970)

```
G                              C
Tom, get your plane right on time
G                         C
I know your part will go fine
G                         C G/B  Am7  Am7/G
Fly down to Mexico
D/F#                           C
Da-n-da-da-n-da-n-da-da and here I am
     G                     C           G
The only living boy in New York

I get the news I need on the weather report
Ah, I can gather all the news I need on the weather report
Hey, I've got nothing to do today but smile
Da-n-da-da-n-da-da-n-da-da and here I am
The only living boy in New York

Half of the time we're gone but we don't know where
And we don't know where
Ah, ah, ah
Ah, ah, ah
Here I am...
Half of the time we're gone but we don't know where
And we don't know where

Tom, get your plane right on time
I know that you've been eager to fly now
Hey, let your honesty shine, shine, shine now
Da-n-da-da-n-da-da-n-da-da
Like it shines on me
The only living boy in New York
```

Figure 1

SYSTEM FOR PRESENTING GRAPHICALLY ORGANIZED AND RHYTHMICALLY ALIGNED SONG INFORMATION

RELATED APPLICATION

This application claims priority from U.S. Provisional Patent Application Ser. No. 63/236,827 filed Aug. 25, 2021, for "Graphically-Organized and Rhythmically-Aligned Song Chart Creation Method and System."

BACKGROUND

Musicians need the chords and lyrics to songs they wish to learn, teach, or perform. Many musicians rely on the internet to find this information yet most online sources of information, e.g., chord or song charts, fail to meet a basic need of musicians in that they do not adequately convey musical or metrical time.

The current song chart landscape also poses problems for users of different levels. For the teacher or aficionado writing out the chords to a popular song, or the songwriter jotting down chords and lyrics to an original composition to share with bandmates or collaborators, the process of creating clear, accurate charts that communicate rhythm, song structure and form is both challenging and prohibitively time consuming.

In the most ubiquitous form of currently known web-based song charts, a song's lyrics dictate the layout of the chords. More specifically, chords and lyrics appear in alternating lines of text, with chord names, e.g., Am7, F♯, etc., positioned over a word, or a syllable of a word, to indicate where a chord change occurs.

These types of charts are relatively easy to produce using, for example, Chord Pro, a text-editor program that utilizes fixed-width fonts and which aligns chords and lyrics in alternate lines. Of course, one can use any word-processing program and manually align alternating rows of chords and lyrics—a more time-consuming process.

These alternating chords/lyrics charts, however, do not adequately convey the time, or timing, of the song. They do not indicate how those chords and lyrics represent the rhythm of the song. As a result, a significant disadvantage is inherent in this alternating chord/lyric layout because a musician relying on such a chart needs to have familiarity with the song in advance. Without such knowledge they must guess the temporal organization to successfully learn and play the song.

There have been attempts to solve the issue of representing time, e.g., Heartwood Guitar included the number of bars in parentheses and Songsterr displays bar lines. Chordify and Real Pro display chords in metrically organized time but do not include lyrics.

There is, of course, standard "sheet music" that conveys information regarding melody, temporal organization, and form, but which requires specialized musical training to read and decipher and is often unwieldy in length. Lead sheets and other transcriptions utilize western notation to represent a melody, with song lyrics aligned vertically below the written notes. Chords are shown either in standard notation or else in chord symbols. Sheet music layouts vary greatly, sometimes displayed with a consistent number of measures in each line, but more often privileging consistently spaced notes and economy of space on the page. Full transcriptions can take up several pages. For musicians who do not read standard notation, this information is unhelpful at best and, at worst, confusing, intimidating and very difficult to navigate. For the creators of sheet music, the process is time consuming and laborious.

Music notation software programs, e.g., Sibelius, Finale and MuseScore, can be used to produce musical scores with a large amount of detail and specificity, however, each of these are complex programs with a considerable learning curve. Even for skilled users of these programs, creating a clear, time-aligned chords-and-lyrics chart would take far too long, as this is not these programs' primary purpose.

A system that does not have the inadequacies of known systems in representing a song's lyrics and related chords is needed.

SUMMARY

In one aspect of the present disclosure described herein, a user-operated toolset balances the musical information, i.e., the lyrics, chords, timing, and song form, to create a rhythmically aligned, graphic song chart.

In one aspect of the present disclosure there is a method, in a system including a display device and a computer, of presenting a graphic representation of a musical song, the computer comprising a processor and a tangible computer-readable medium storing a plurality of instructions executable by the processor to implement the method, the method comprising: displaying a first graphical user interface (GUI) on the display device; receiving, via the first GUI, first information about the musical song; displaying, in a second GUI, the received first information; receiving, via the second GUI, second information about the musical song; and displaying, in the second GUI, the first information and the second information in a predetermined relationship to one another.

In one aspect of the present disclosure there is a system for presenting a graphic representation of a musical song, the system comprising: a display device; and a processor, coupled to the display device, the processor configured to: display a first graphical user interface (GUI) on the display device; receive, via the first GUI, first information about the musical song; display, in a second GUI, the received first information; receive, via the second GUI, second information about the musical song; and display, in the second GUI, the first information and the second information in a predetermined relationship to one another.

In one aspect of the present disclosure there is a non-transitory tangible computer-readable medium storing instructions thereon that, when executed by a processor within a system comprising the processor and a display device, causes the processor to implement a method of presenting a graphic representation of a musical song, the method comprising: displaying a first graphical user interface (GUI) on the display device; receiving, via the first GUI, first information about the musical song; displaying, in a second GUI, the received first information; receiving, via the second GUI, second information about the musical song; and displaying, in the second GUI, the first information and the second information in a predetermined relationship to one another.

BRIEF DESCRIPTION OF THE DRAWINGS

One or more aspects of the present disclosure are discussed below with reference to the accompanying figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous components. For purposes of clarity, however, not every component may be labeled in every drawing. The figures are provided for the purposes of illustration and explanation and are not intended to be limiting. In the Figures:

FIG. 1 presents lyrics to a song;

DETAILED DESCRIPTION

Figure 2:
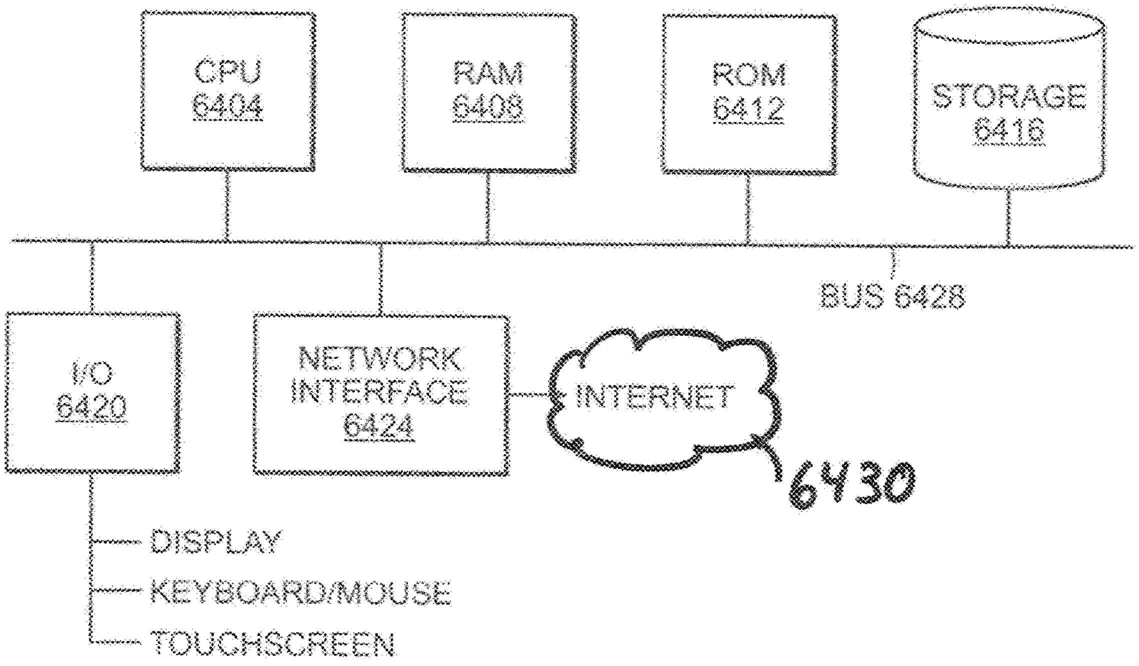
FIG. 2 presents a system on which aspects of the present disclosure can be implemented.

The entire contents of U.S. Provisional Patent Application Ser. No. 63/236,827 filed Aug. 25, 2021, for "Graphically-Organized and Rhythmically-Aligned Song Chart Creation Method and System" is incorporated by reference for all purposes.

The alternating chord/lyrics format of known systems obscures the underlying, metrical organization of a song by aligning the lyrics according to the song's poetic phrasing and not according to the song's musical meter. A musician without prior knowledge of the song, therefore, must guess the temporal organization, i.e., the beat, to be able to successfully learn and play the song because the poetic phrasing of the lyrics does not necessarily convey the musical meter.

Referring now to FIG. 1, the lyrics to the song "The Only Living Boy in New York" written by Paul Simon and performed by Simon & Garfunkel[1] are set forth. Unless one is already familiar with the song, however, it is difficult to figure it out, even with the chord annotations, e.g., G, C, Am7/G, etc., some of which are shown in FIG. 1.

[1] This song is the eighth track (an organizational scheme found on vinyl records—ask your grandparents for more information) from the duo's fifth and final studio album entitled "Bridge over Troubled Water," released in 1970. The song was also issued as the B-side (ask your parents) to the duo's "Cecilia" single. BRAINTEASER: How many grooves on each side of a vinyl record?

Generally, most known song chart formats suffer from one or more of the following deficiencies:

- Inadequate information as to harmonic rhythm, i.e., rate of chord changes and timing.
- A lyric-based layout that obscures the song's metrical organization.
- Information overload, especially for the amateur musician who does not read standard western notation, or the person uninterested in tablature.
- Unwieldy, i.e., multiple pages in length.
- Errors in assessing chords.
- Lyrics are lacking or there are errors in the lyrics.
- Multiple, competing versions of a chord chart, adding to the confusion.

None of the known systems, however, solves the issue of providing a song's harmonic and lyrical, measure-by-measure timing, let alone timing at a specific beat or individual-syllable level.

In one aspect of the present disclosure described herein, a toolset is operated by a user to create a song chart that integrates the musical information, i.e., the lyrics, chords, timing, and song form, to create a rhythmically aligned, graphic song chart.

Advantageously, musicians, composers, players, etc., will benefit from this rhythmically aligned song charting system. Further, users will be able to edit song charts to suit their interpretive needs. Teachers, songwriters, bands, ensembles—musical collaborators of all kinds—will be on the same page, literally, and musically in time.

In one aspect of the present disclosure there is a method, implemented in one approach by the execution of a software program, for generating song charts that improves on existing models, offering a flexible method for creating a visually clear, graphic layout of a song's chord progression, lyrics, rhythm, form, and overall structure.

To overcome the inadequacies and shortcomings of the existing current song-chart landscape, aspects of the present disclosure provide one or more of the following features:

- a graphic layout that conveys equal units of time;
- a bar-level organization of both chords and lyrics;
- an ability to further refine chart organization to the beat and the sub-beat levels;
- an ability to label and clearly distinguish various parts of the song form, e.g., intro, verse, chorus, bridge, and outro;
- an ability to customize rendered output: design, layout, and page;
- a smart transposition feature; and
- a playback capability with adjustable tempo.

Various aspects of the present disclosure include systems and methods that may be implemented in digital electronic circuitry, in computer hardware, firmware, and/or software. The implementation can be, for example, a computer program product, i.e., a computer program embodied in a tangible information carrier, a machine-readable storage device to control the operation of data processing apparatus or a programmable processor, a computer and/or multiple computers operating over the internet. The computer program may be accessed over a network, for example, the internet and, therefore, run remotely from a user's location. The user may access the program through a device such as a smart phone, tablet or laptop via a browser as is understood by those of ordinary skill in the art.

Referring to FIG. 2, an aspect of the present disclosure may be implemented on a system that may comprise a CPU 6404, RAM 6408, ROM 6412, a mass storage device 6416, for example, a disk drive, an I/O interface 6420 to couple to, for example, a display, a keyboard/mouse or a touchscreen, or the like, and a network interface module 6424 to connect to, either wirelessly or via a wired connection, to the Internet 6430. These modules are in communication with each other through a bus 6428. The CPU 6404 executes an operating system to operate and communicate with these various components. The CPU 6404 also implements a method, in accordance with the present disclosure, that is a computer program stored in at least one of the RAM 6408, ROM 6412 or the mass storage device 6416.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

The aspects of the present disclosure generally depict a computer implemented system employing at least one processor executing program steps out of at least one memory to obtain the functions herein described. It should be recognized that the presently described methods may be implemented via the use of software, firmware or alternatively, implemented as a dedicated hardware solution such as in a field programmable gate array (FPGA) or an application specific integrated circuit (ASIC) or via any other custom hardware implementation.

In one aspect of the present disclosure, the functions are implemented via a website that is accessed by the user. It should be noted that any explanation herein with respect to a website implementation is for explanatory purposes only and not intended to be limiting. Accordingly, as discussed herein, aspects of the present disclosure may be implemented as, for example, an application on a smart device or computer or a dedicated device.

In general, aspects of the present disclosure allow a user to create a functional song chart in a straightforward process as follows.

Figure 3:
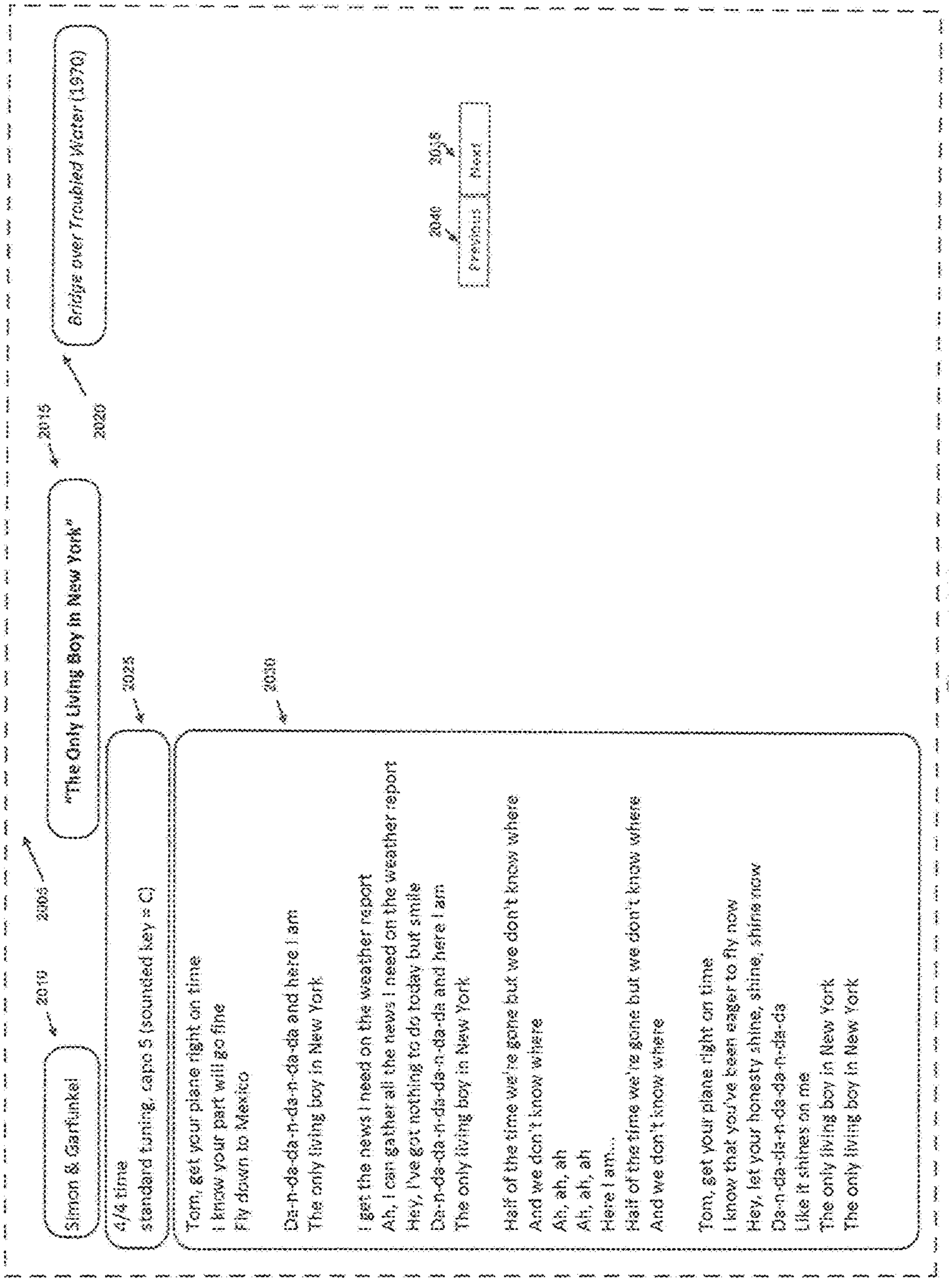
FIGS. 3-9 represent different states of a GUI interface in accordance with an aspect of the present disclosure.

Initially, in one embodiment of the present disclosure, a user is presented with a first Graphical User Interface (GUI) screen 2005 as shown in FIG. 3 through which a song's information can be entered and processed as described herein. Several fields are presented in which the user can enter a song's identifying information.

Thus, in a non-limiting example, a first field 2010 can have the artist's name entered and a second field 2015 can have the title of the song. A third field 2020 can have, for example, the title of the album in which the song first appeared. A timing/tuning field 2025 can have musical timing information, i.e., the principal time signature, entered into it along with tuning-related information, for example, standard tuning, i.e., played key (G), guitar capo position (5) and the sounded key (C). The sounded key is determined by the system from the played key of G with capo at the $5^{th}$ fret. A lyrics field 2030 can receive the lyrics to the song being processed. It should be noted that the arrangement of the fields 2010, 2015, 2020, 2025 and 2030, in addition to which information is provided in a field, is a design choice and is not limited to that arrangement shown in the Figures.

As listed above, the information can include song title, as performed by, composed by, recording release name, release year, time signature, played key, capo position, etc. Among these information fields, the principal time signature and the key will influence the bar line layout.

Generally, as will be described below, the number of beats, and divisions of beats, are a function of the principal time signature and will determine an internal distribution of beats with each bar. Accordingly, 4/4 time will divide each measure into four simple beats, wherein each beat has a value of a quarter note, where each quarter note is divisible into two eighth notes, for a total of eight equally spaced positions per measure. The played key information, along with capo position, will influence how chord symbols are to be interpreted and how transposition is implemented. The other field information will be included in metatags and will populate a song chart header.

Further, the information in any field does not have to be that which is shown and could be different information and/or different combinations of information related to the song. Certainly, some of the fields could be empty with no information entered by the user.

As is known to those of ordinary skill in the art, the information can be directly typed in by the user or the user can cut/paste the text through, for example, a WYSIWYG interface. A user may move from one field to another either by clicking on a field or using, for example, the tab key to move from one to the next. Further, the user can modify the text in any field by inserting, deleting, moving, etc. The underpinnings of such a GUI screen 2005 and its operation are well-known and need not be discussed herein. As shown in FIG. 3, the example information corresponds to the song and lyrics presented in FIG. 1.

Figure 4:
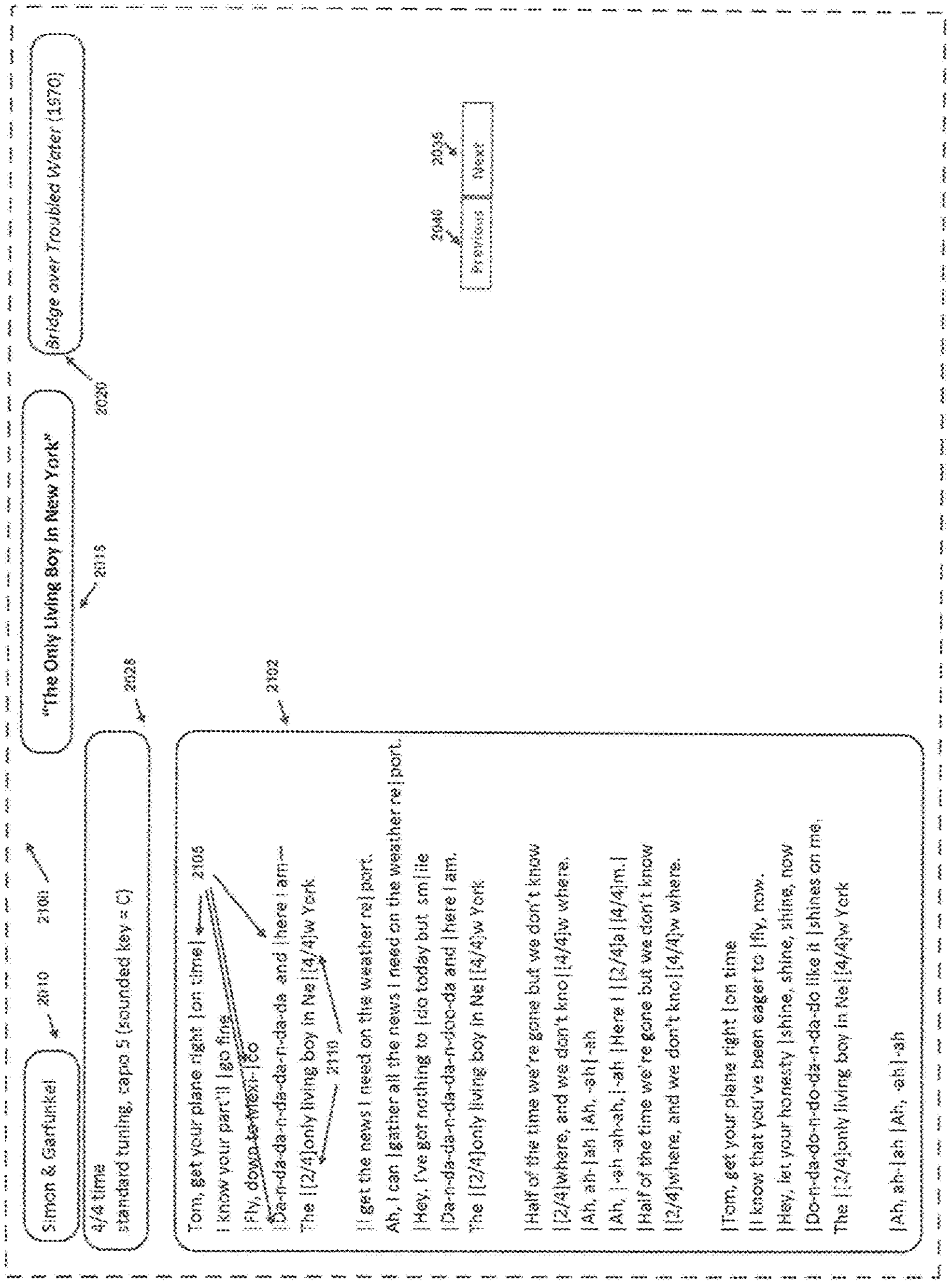

Once the user has entered the information in the fields, they may actuate a next button 2035 to move to a second GUI screen 2100 as presented in FIG. 4. Here, the user can insert a new bar symbol 2105 where they want to insert a new bar, represented by a vertical line, amongst the lyrics in a modified lyrics field 2102. In one non-limiting example, the new bar symbol 2105 is a unicode U+007C vertical line, |, placed immediately to the left of each initial downbeat of a desired bar. Of course, any symbol that is most likely different from what is present in the lyrics can be used and the choice of which could be presented to the user as an option when setting preferences of operation. The new bar symbol 2105 may be presented in a different color to aid in discerning where they have been placed and the color can be selected by the user. Advantageously, the new bar symbols 2105 can be placed within a lyric line and even within a word and, therefore, the lyrical or "poetic" layout need not "control" the song's meter and a better sense of the song's timing can be generated.

In addition, if the user needs to indicate a change to the time signature within the song, i.e., at any place within the song's lyrics, the user can indicate such by inserting, for example, a change time symbol 2110. In one non-limiting example, the change time symbol 2110 includes the new metric time value between brackets, as in "[2/4]." The metric time value is presented in the Figures as a time identifier 2220 as is familiar to most musicians. Once the user has entered the bar line symbols 2105 and the change time symbols 2110 that they want, they activate the next button 2035.

Alternatively, when, for example, the user needs to correct a lyric, they can activate a Previous button 2040 to take them back to the previous screen 2005 and make the changes they need to. Any changes they make to the lyrics field 2030 would then be reflected in the modified lyrics field 2102 and vice-versa. In one embodiment of the present disclosure, if desired, the user can set the system such that changes made in subsequent fields are not reflected in prior fields.

Figure 5:
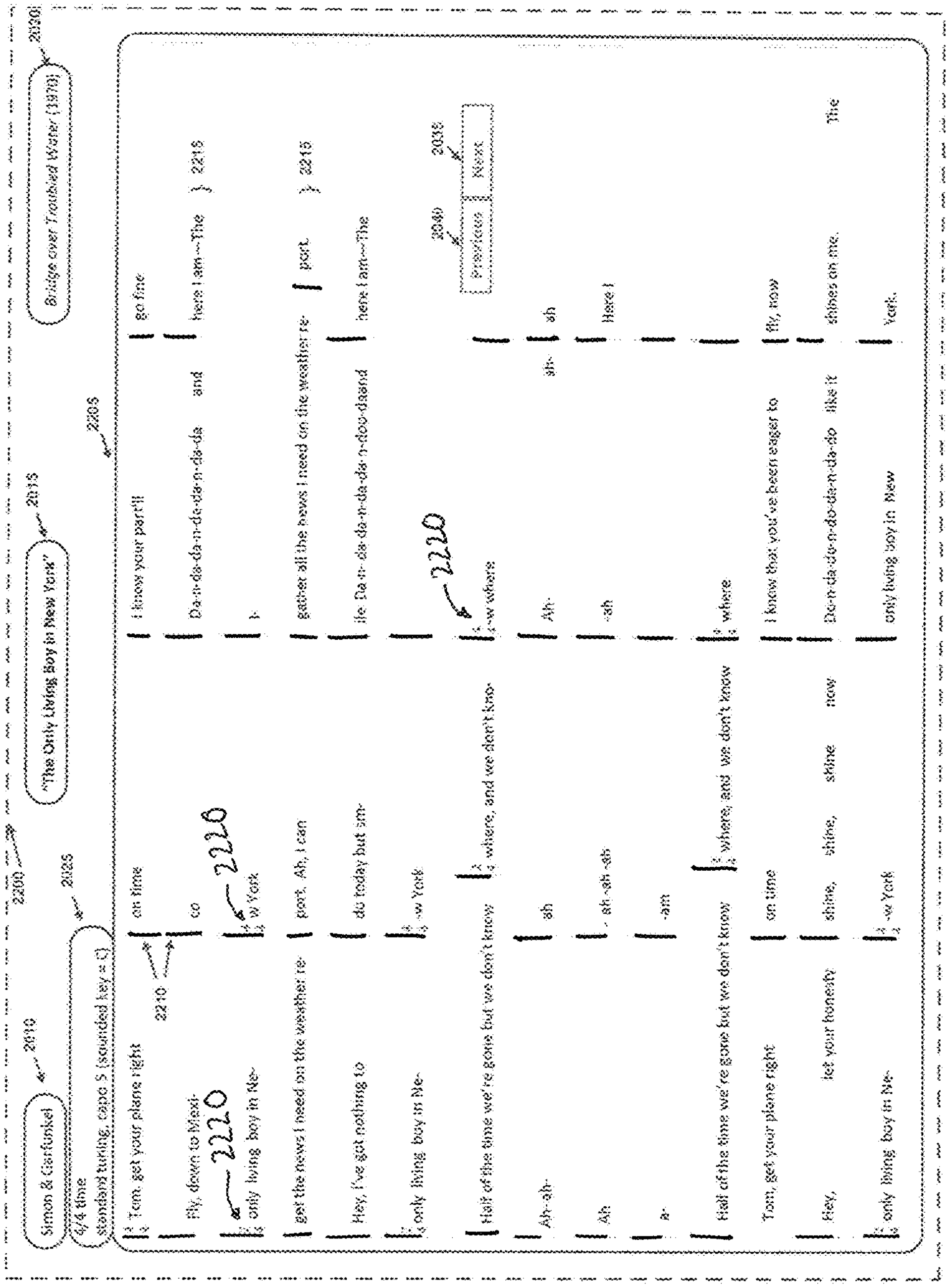

Once the user chooses the next button 2035 in the GUI screen 2100 the lyrics are laid out in a metric field 2205 of a GUI screen 2200, as shown in FIG. 5. As shown, this is presented in a four-bar-per-line grid where four bars 2210 per line 2215 is a default setting that can be modified by the user in a settings or preferences panel. Advantageously, the bar-level organization layout in FIG. 5 provides a graphic layout that conveys metric timing and lyrical timing that is not discernable with the lyrics aligned only by poetic phrase.

It should be noted that the metric timing layout shown in the Figures is organized around four-measure units, as is much of western popular music. Many verse structures in western popular music have 16 bars, with chord progressions organized in four, four-bar units. It is a system of nested fours: four beats per bar, four bars per line, and four lines per verse. The four-measure format is presented as an example only and aspects of the present disclosure are not limited to this format.

The user can review the information in the metric field 2205 in order to make any desired, or necessary, changes to the timing, the location of measure breaks 2210, the lyrics, etc. These changes can be achieved by selecting one or more words, syllables, or letters, and dragging the selected lyrical snippet to a new location on the chart in, in one embodiment, a WYSIWYG implementation, as is known to those of ordinary skill in the art, is used. Any changes made in the metric field 2205 will be reflected in the previous fields.

Alternatively, the user may implement the previous button 2040 in GUI screen 2200 to return to a previous screen to make any changes. It should be noted that some of the fields described herein can be edited as WYSIWYG or could have pulldown menus to limit information that can be entered. These are design choices left to any particular implementation and are well known to those of ordinary skill in the art.

Figure 6:
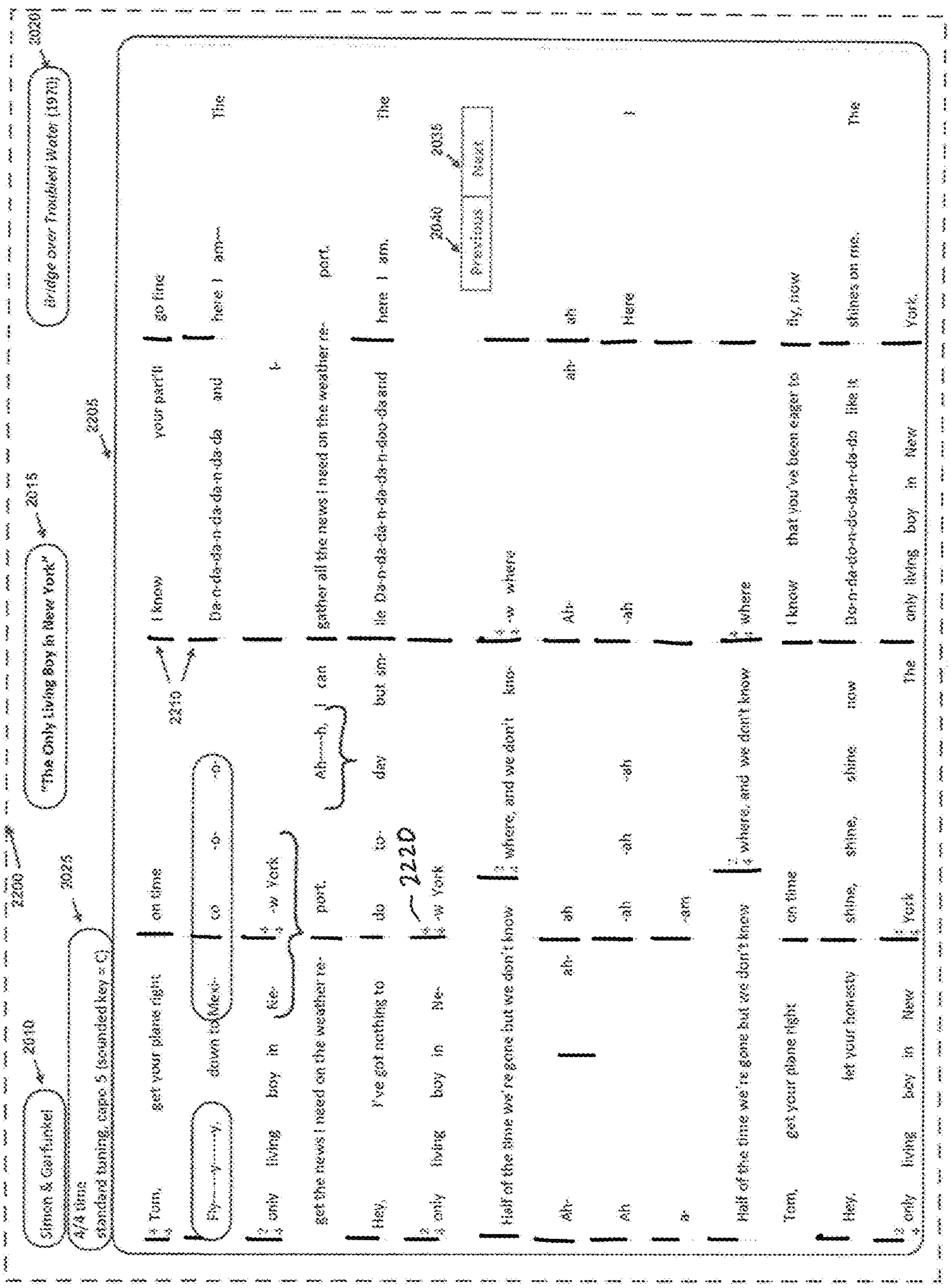

In an aspect of the present disclosure, the user can also refine the level of location detail to the beat level, or division of the beat, by selecting and dragging text to a new location within the measure. Thus, for example, referring now to FIG. 6, the user is modifying and aligning the word "Fly" in the lyrics to "Fly-------y-------y" to show how the word is spread across individual held beats. The user can edit the lyric text to convey held syllables, as in "Mexi- co -o- -o-," across two measures to show where the lyric "fragment" occurs within the bar. Of course, the lyric "Fly" could be changed to "Fly-------y-------y" in any of the previous screens.

Figure 7:
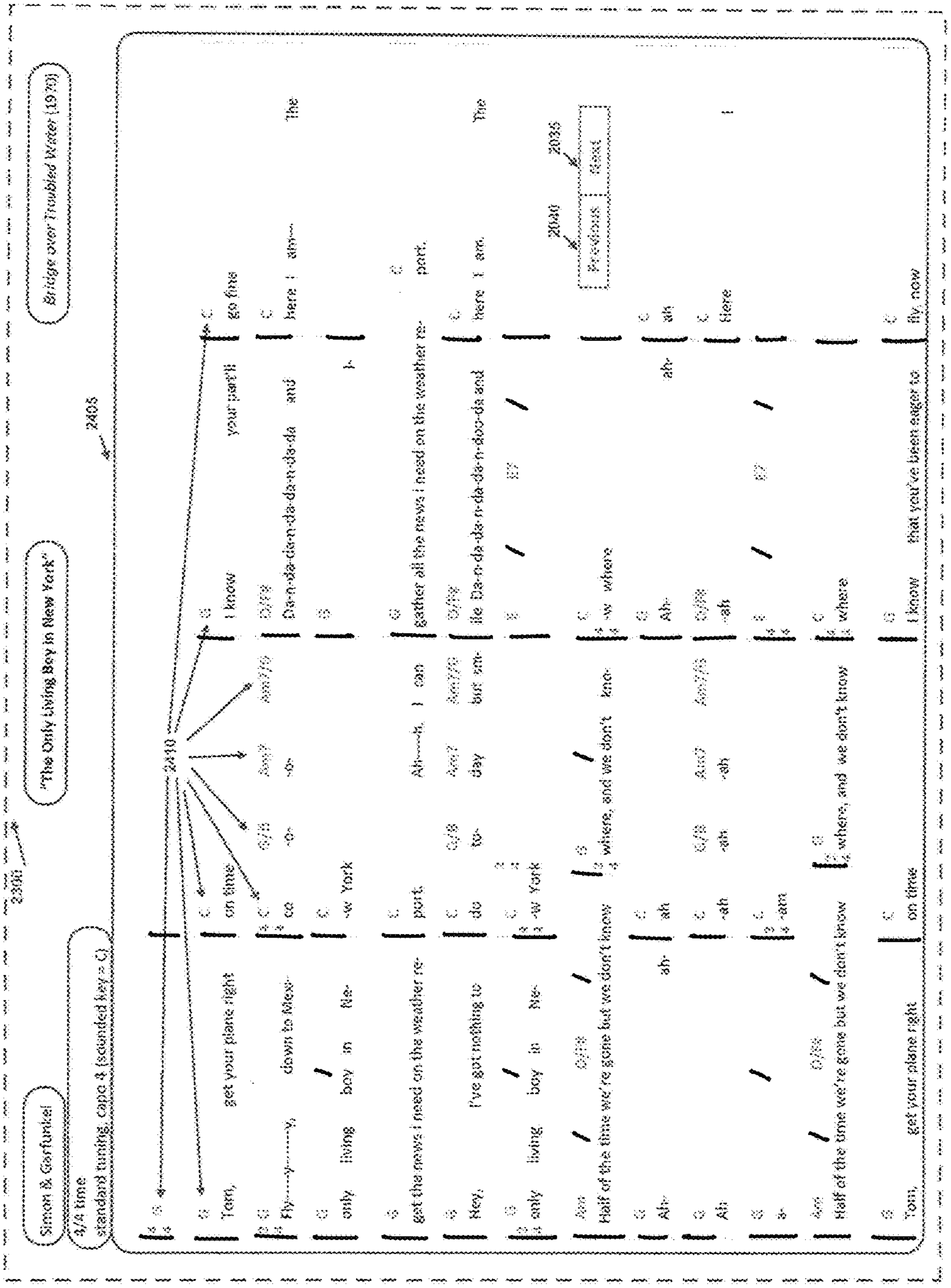

Once the lyrics are aligned to each measure, the user can add chords by clicking the next button 2035 and proceeding to a chord GUI screen 2300 and editing the information in a chord field 2405, as shown in FIG. 7. Alternatively, the user could have added chords at any point in the previous steps discussed above by, for example, placing chord identifying information between brackets, {Am7}. One or more chord symbols 2410 are added by clicking on any beat position and entering a chord symbol 2410, e.g., G, C, Am7, etc. The chord symbols 2410 will appear above the lyric line, creating a song chart comprised of double rows, with chords over lyrics. In one embodiment of the present disclosure, the chord symbols 2410 can be edited, and their location shifted, independently of the lyrics and the user can tether a chord symbol 2410 to a corresponding lyric syllable.

Figure 8:
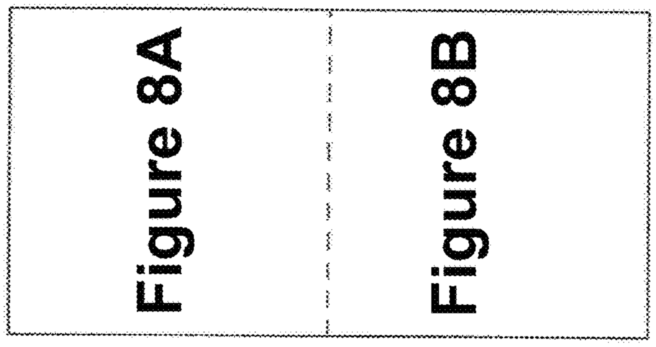
Figure 8B:
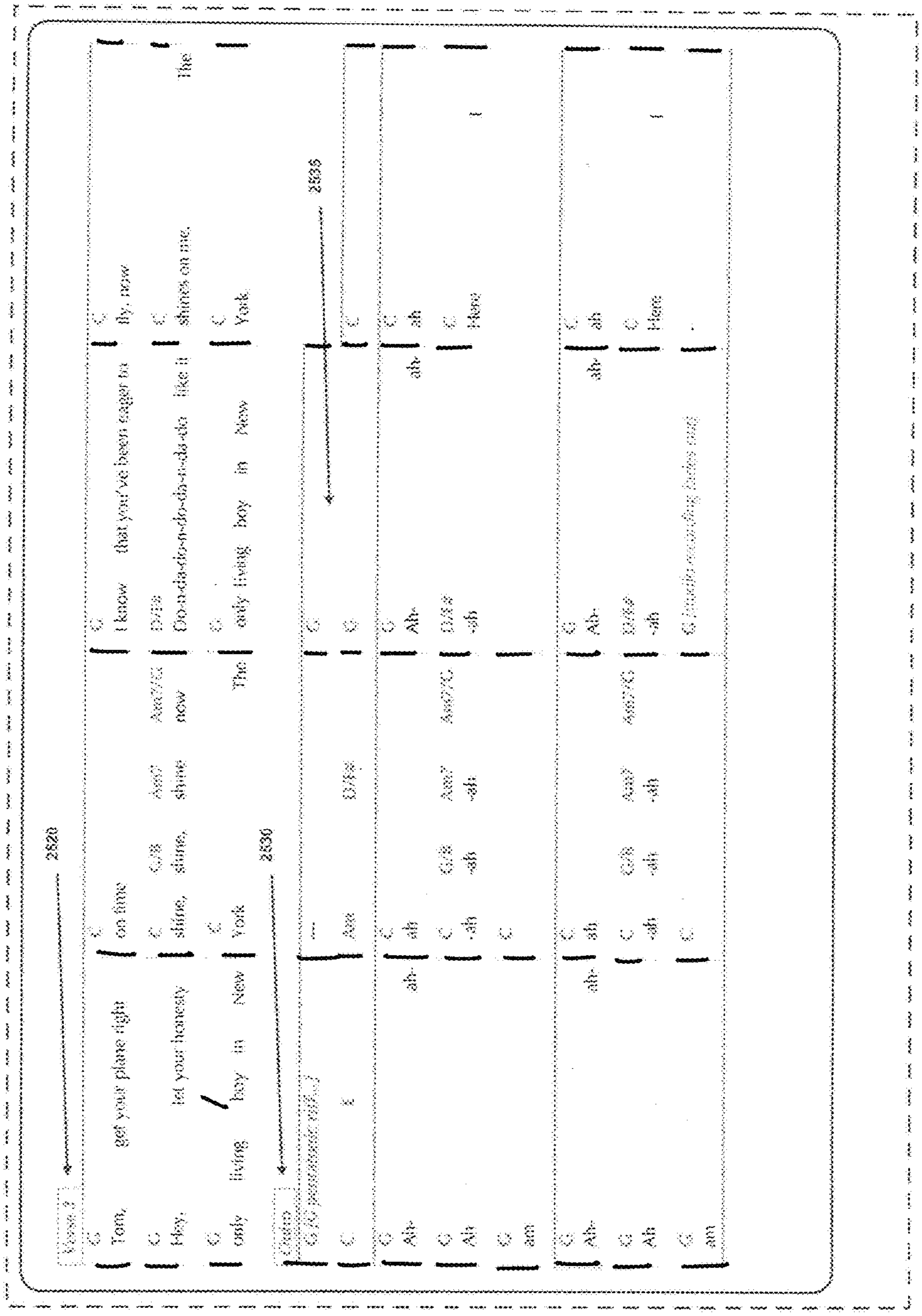
Figure 9:
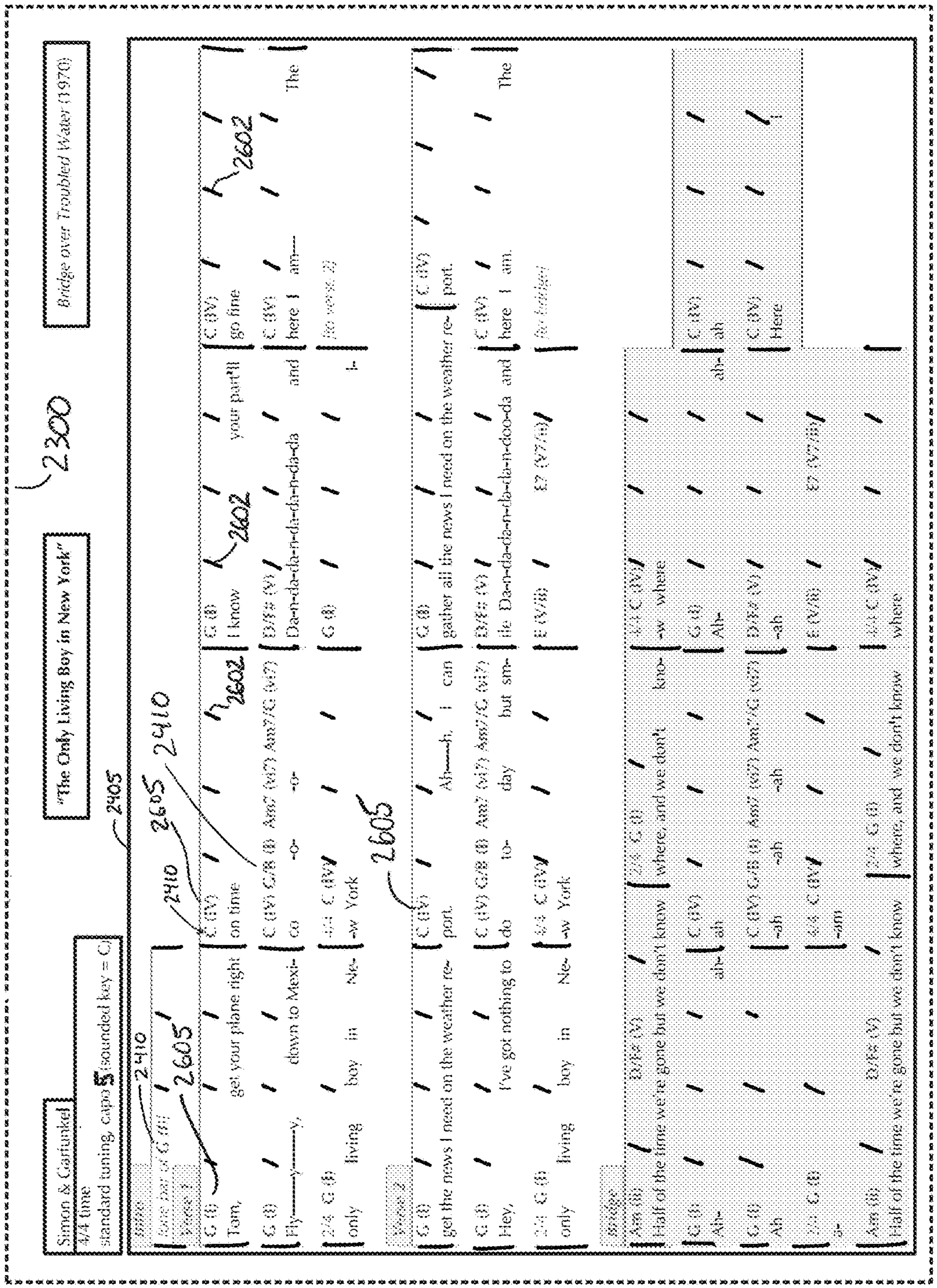
Figure 10:
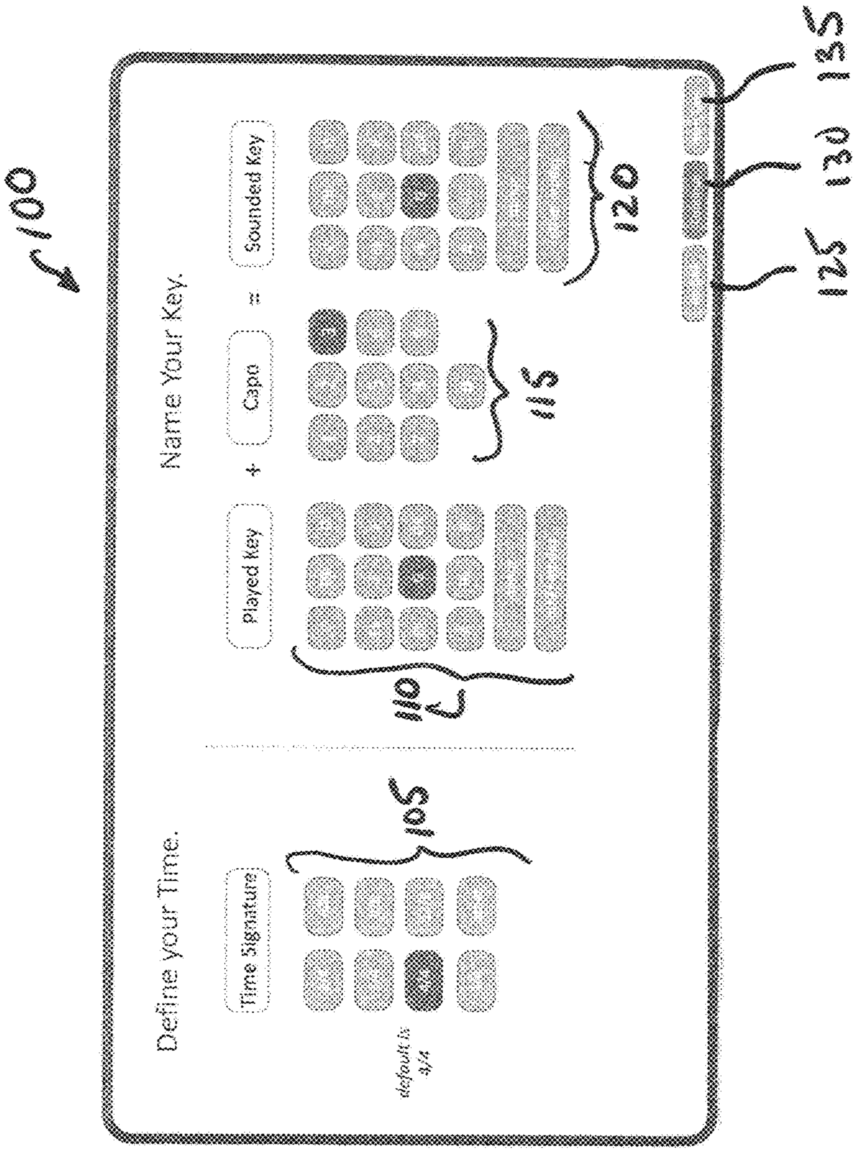
FIGS. 10-13 present a set of GUI interfaces in accordance with another aspect of the present disclosure.

A beat marker 2602, for example, a forward slash, indicates where a beat can be added as is shown in FIG. 9. Each beat marker 2602 indicates a beat in the measure and the user can choose to have them shown or hidden to reduce visual clutter on the display as in, for example, FIGS. 5-8B. The exemplary beat markers 2602 are forward slashes and can be set off in a contrasting color for easier identification. Of course, a different symbol can be used, however, the standard musical symbol used in notation and lead sheets is a bold, diagonal line that looks like a "/" (forward slash). The user can modify or move the lyrics to align with the beat marker 2602. It should be noted that the chord symbol 2410 is a beat marker as it is usually the downbeat of a given bar. Further, in one aspect of the present disclosure, rather than marking the division of the beat, an eighth note, the user can position a lyric at a midpoint in between the beat markers. Again, the user can then edit the chart, making any necessary changes or corrections. Chord symbols 2410 may be displayed in an easy-to-read color to contrast with the default black text.

Figure 8A:
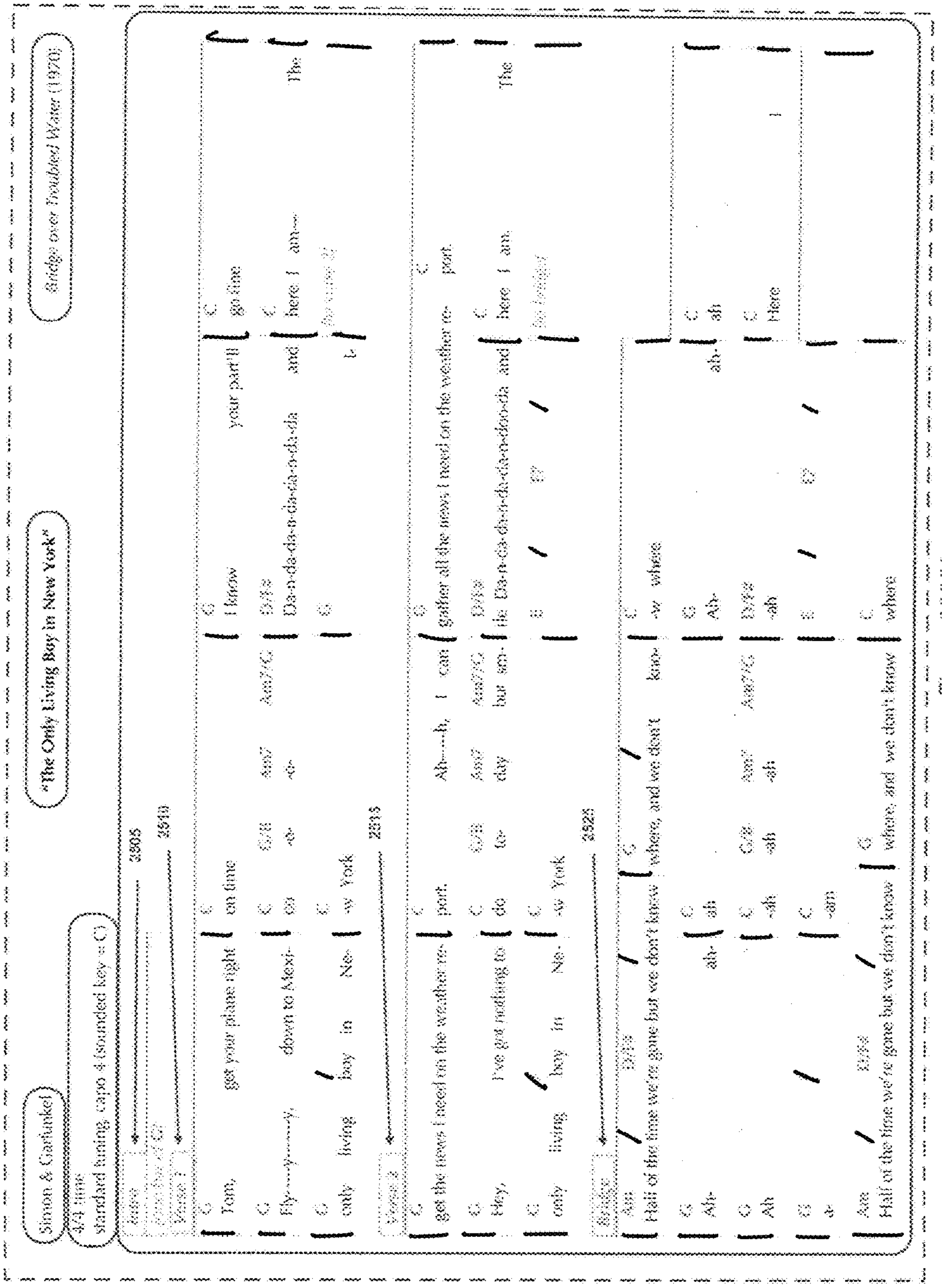

Referring now to FIGS. 8, 8A and 8B, the user can add labels indicating the different parts of the song form, e.g., an intro identifier 2505; one or more verse identifiers 2510, 2515 and 2520 for verses 1, 2, and 3, respectively; one or more chorus identifiers (not shown); a bridge identifier 2525, and an outro identifier 2530. In addition, rehearsal marks and other playing instructions can be added. The system can use shading 2535 and other graphical tools to visually distinguish the song sections, thereby facilitating reading.

Further, as shown in FIG. 9, in one aspect of the present disclosure, the user can include Roman number identifiers 2605 in the output. With the Roman number identifiers 2605, the user can use Roman numeral analysis to analyze the harmony of the song. The Roman numerals can be used to notate the chord progression of a song independent of key. Further, the Roman number identifiers 2605 can facilitate transposition (and learning how to transpose), for songwriters/composers looking to better understand harmony, try new compositional ideas, substitutions, e.g., "what if I changed this chord to a bVII?" and the like.

As the chart is developing, the user can also adjust the format, layout, and typographical settings. The user can choose between portrait or landscape page format. Depending on font type and size, a portrait layout with four bars per line may not fit all the required text in each bar. The system will suggest an optimal format based on the spacing requirements presented by the lyrics. A full suite of text formatting options allows the user to customize the look of their chart.

In one aspect of the present disclosure, the song chart presented in FIG. 8, without the reference numbers, can be saved as, for example, a PDF, and/or exported for digital or printed output or viewed on a handheld device or any other type of display.

While some embodiments of the present disclosure can be implemented as standalone programs, other embodiments may be implemented as macros within an existing program such as Microsoft Excel. Tables can be configured and labeled to receive the time signature, and whether to show/hide divisions of the beat and the lyrics. The beat markings and if desired, beat divisions (upbeats), can be identified by the user inserting predefined symbols for each where, for example, the asterisk symbol (*) indicates the beginning of a new beat, and the up arrow (^) indicates an upbeat where each of these symbols serves to advances the text from beat to beat. Chords can be inserted by placing the chord symbol in brackets. For example, inputting "{G}Birth" would insert a G chord above the "B" in the syllable "birth" of the word "birthday." As the macro runs, the chart emerges in a window. The author can now view the song chart in progress, continuing to add, reposition, or otherwise edit both chords and lyrics. Any changes in the window are reflected in the text entry field, and vice versa.

The result is a more fully realized song chart with a far greater value and utility. Now a musician with minimal familiarity with notation or written music can get a sense of a song's timing, when to change chords, and when to sing each phrase of the lyrics.

The visual map of the present disclosure allows the user to see the harmonic and rhythmic structure of the song while creating the song chart. This same visual layout is the key element in communicating the chord progression, harmonic rhythm, form, and most advantageously, time. That same flexibility and editability benefits the consumer/end user, who will be able to adjust the font, sizing, page layout, and more, to suit their needs and preferences.

An advantage of a system in accordance with the present disclosure is that a user can look at the results in progress, perhaps play and/or sing their way through the song, or a portion of the song, and discover where they might have erred, i.e., where some element of the song structure is different from what they thought it was, or where they might want to make a change. There is a significant advantage to being able to move back and forth between steps in the process resulting in "iterative song sculpting."

In another aspect of the present disclosure, an output of the system can be provided to a MIDI system including a speaker so that the chords can be played back in accordance with the timing that is set through the process described above. This allows the user to hear the song and further aids in understanding how the song is meant to be played.

The result is a more fully realized song chart with a far greater value and utility. Now a player with minimal familiarity with notation or written music can get a sense of a song's timing: when to change chords, and when to sing each phrase of the lyrics.

Aspects of the present disclosure include functions that provide one or more of:

- A system for creating clear, professional, easy to follow song charts.
- A graph-based layout that conveys when lyrics occur in musical time.
- An ability to further refine organization to beat and sub-beat levels.
- A form that is clearly communicated. The user can better understand, and convey to others, the relationship of lyrics, chords, and song sections (intro, verse, chorus, bridge, etc.), at different levels of organization:
  - beat (and sub beat);
  - individual measure;
  - line (e.g., four measures);
  - number of lines in a section; and
  - sections in a song—how many, their order, and variation between them (e.g., chorus #2 ends with a different chord).
- That one does not need to know a song in advance to play from the chart.
- An efficient use of space—charts usually fit on one or two pages (or scrolling screen).
- Drag and drop editing
- Pickup beats, shifting time and key signatures, extra measures, and all other song variables are conveyed in an easy-to-follow layout.
- A transposition tool—ability to calculate and display both the sounded key as well as the key "as played in" based on guitar capo position.
- Smart Roman numeral analysis allows the user to see the harmonic organization, independent of the particular key. Useful for transposition (and learning how to transpose), for songwriters/composers looking to better understand harmony, try new compositional ideas, substitutions (e.g., "what if I changed this chord to a bVll?").
- Customizable typography—user can choose font, color, and size.
- Song sections are movable. Great for composers, songwriters, bands, and recording producers looking to try out different song structures and arrangements.

It should be noted that the choice of layouts for a set of GUI interfaces is a design choice. Accordingly, many different GUI interfaces can be designed to implement one or more aspects of the present disclosure.

Referring now to FIGS. 10-13, one such group of exemplary GUI interfaces is set forth. At a first GUI screen 100, the user can access a set 105 of predefined buttons to define a time signature. Similarly, sets of buttons 110, 115, 120 can be used to select a played key, capo and sounded key, respectively.

Figure 11:
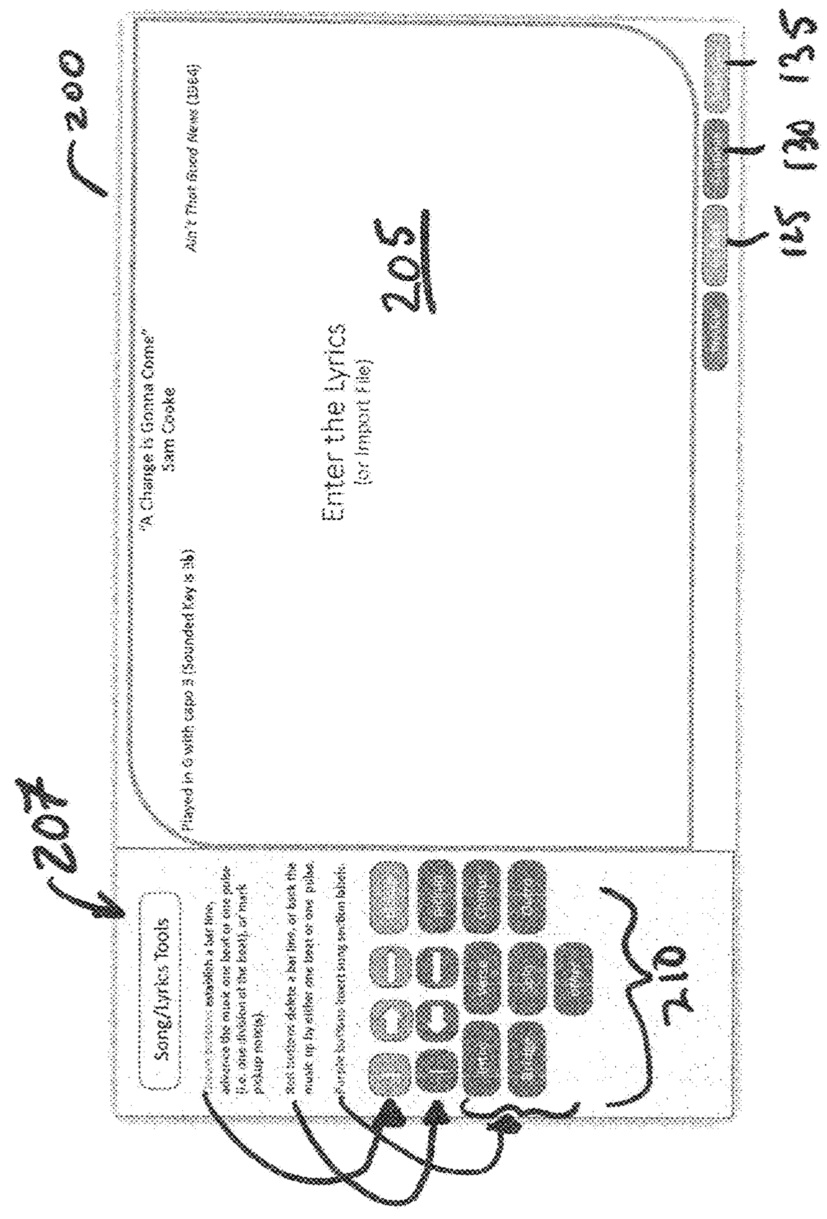

The user then selects one of a "Go Back" button 125, a "Continue" button 130 and a "Start Over" button 135. When continuing, the user is taken to a next GUI screen 200, as shown in FIG. 11. Here, the user inputs song information into a song information field 205. The song information includes, for example, but not limited to, and where not all the listed information is required: song title, as performed by, composed by, recording release name, release year, time signature, key, capo, etc. The time signature and the key will influence the bar line layout as will be described below. The other field information can be included in metatags and populate a song chart header. A sidebar 207 is provided which presents a suite of tools 210 to help build out the song chart, many of which have keyboard shortcuts.

Figure 12:
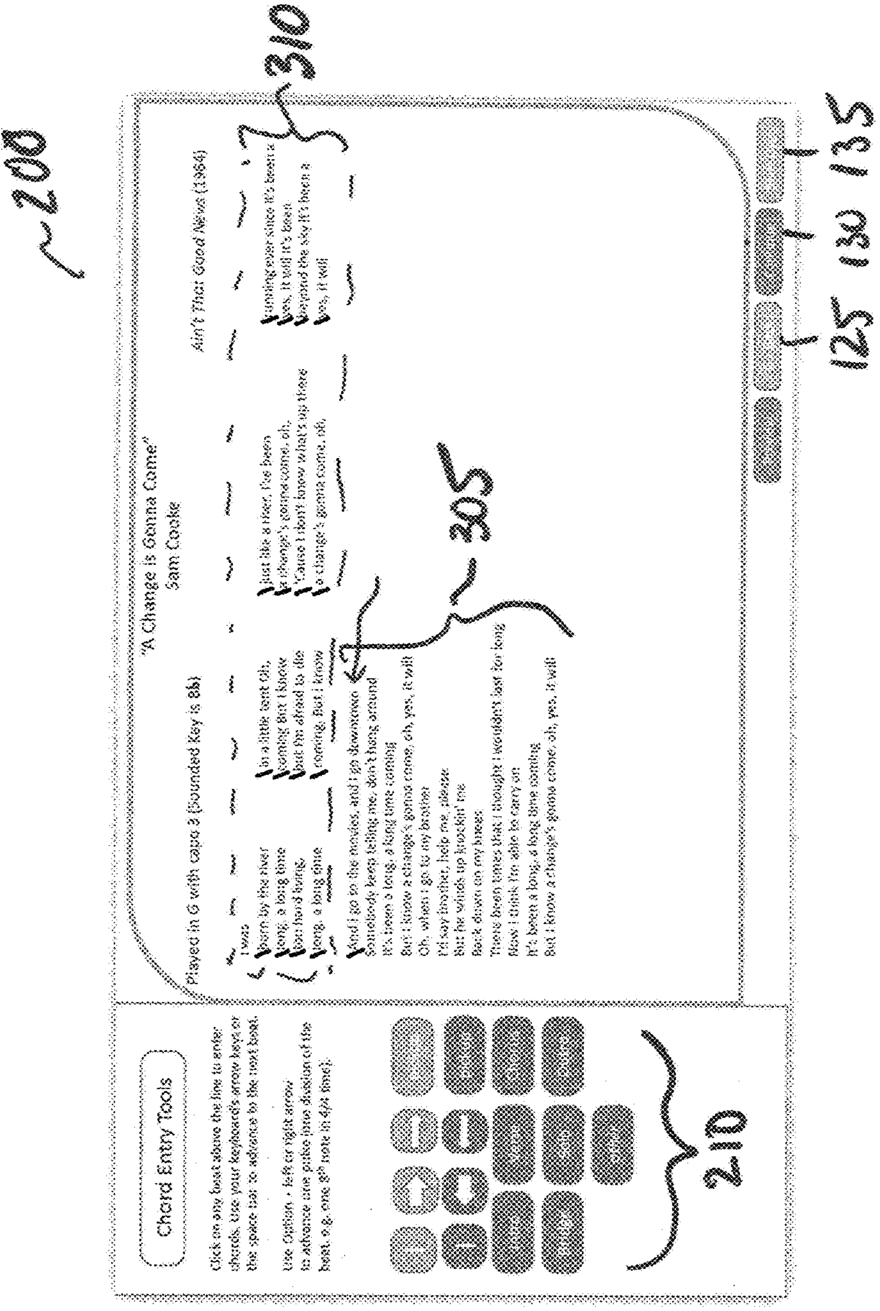

As shown in FIG. 12, the user inputs the lyrics from a song, here Sam Cooke's "A Change is Gonna Come"[2] is being used. The user first inputs unformatted lyric text 305. Next, the user inserts a backward slash (or any other designated text symbol) to indicate the beginning of each bar line and working through the lyrics until the desired bar lines are indicated. The user can press the "Continue" button 130 which will align the lyrics in a four-bars-per line, metrical alignment as shown in an alignment field 310. At this point, the user has the beginnings of a graphical, metrical time-based layout of the song in progress. The ability to visualize a song's harmonic rhythm and overall structure while building out the chart is among the strengths of the tool and offers a major advantage over existing programs.

[2] This song first appeared on "Ain't That Good News," February 1964. The song was inspired most prominently when Cooke and his entourage were turned away from a whites-only motel in Louisiana. He felt compelled to write a song that spoke to Black Americans' struggle and the Civil Rights Movement. This song is considered Cooke's greatest and most influential composition and has been voted among the best songs ever released. In 2007 it was selected for preservation in the Library of Congress, with the National Recording Registry deeming the song "culturally, historically, or aesthetically important."

Figure 13:
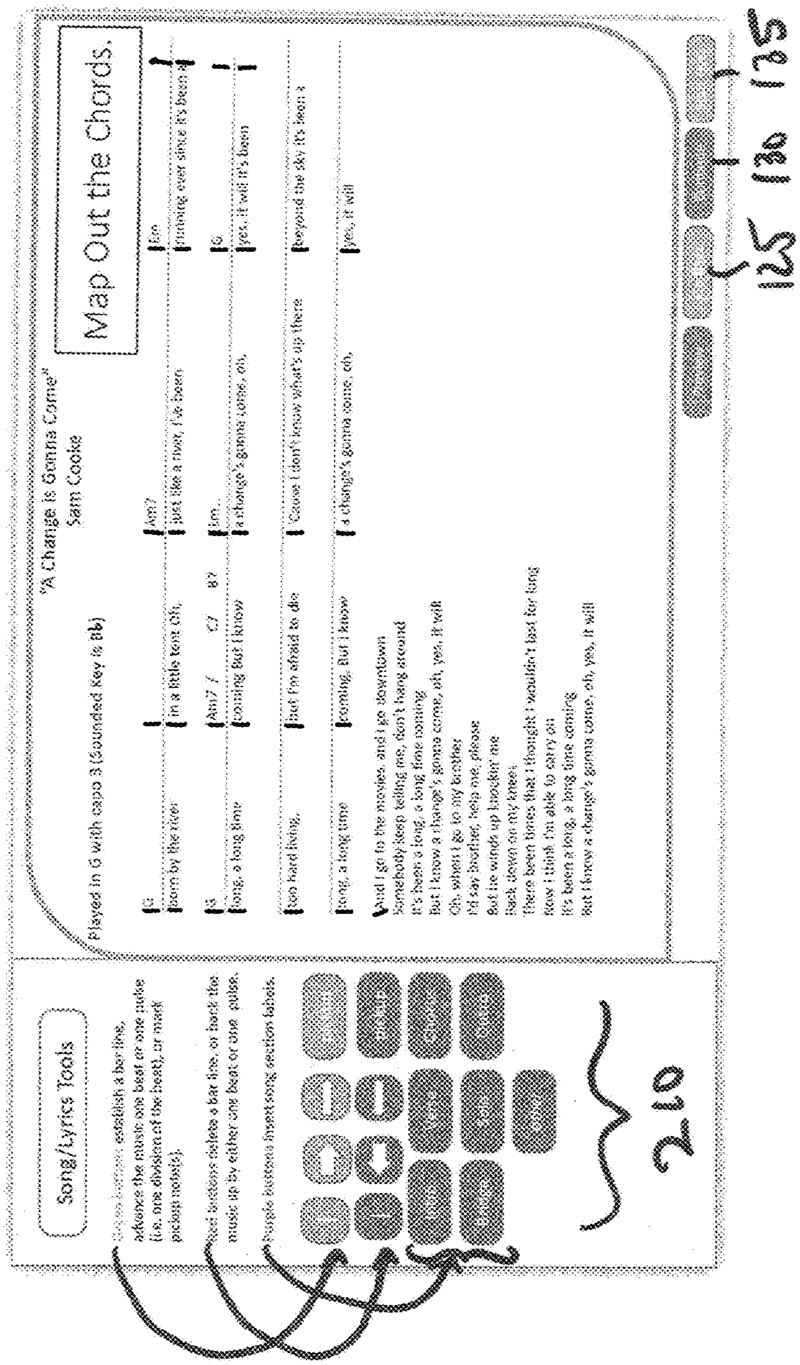

The user can now map out the chords as they occur in time, aligned both vertically to the lyrics, as well as horizontally with respect to the metrical timeline, all as shown in FIG. 13. The system defaults to four bars per line, but the desired number of bars per line can be user defined, as can landscape or portrait layout. Further, the system default is to disregard line break, but can be set to treat line breaks as a new bar line, per the user's preferences settings. The user has the option to continue adding back slashes to the remaining lyrics or select and drag lyrics into the chart.

When the song is fully charted, the user can read through the song and edit the chord symbols and lyrics by selecting and dragging content. Lyrics can be slid as if on a rail, either snapping to beats or divisions of the beat, or "tabbed" over to new beats or beat divisions. This marks a major improvement over programs where lyrics are fixed to their beat location or where lyrics are repositioned solely by way of tab keys, the space bar, or cutting and pasting at cursor insert points.

Once the metrical line is established, chords and/or lyrics can be added and edited in whatever order the user chooses. For example, had the user wanted to, she could have started by inputting chords, then added lyrics.

The ability to customize layouts is another feature as the visual layout can vary from one song to the next. Accordingly, songs with densely packed lyrics may benefit from a landscape page setup, while songs with multiple sections may be presented more clearly in portrait layout.

Margins, or more specifically, the left and right-side gutters just inside those margins are a related issue and are utilized in a novel way in the tool, particularly as they relate to pickup beats, odd- or irregular numbers of bars, and overall melodic phrasing. The key is to balance two directives: one, to preserve as much of the graphical organization and structure as possible, the other, to render the lyrical phrases in the most readable, intuitive way possible. To that end, pickup beats can be in one of two places: to the left of the full chart, or in a separate, top line of the chart. Variations in the number of bars per line can be handled any number of ways. The right gutter can be used to accommodate a single, extra bar of time. In addition, one can manually insert one or more bars in any line, or insert a line break. A line with fewer than the established number of bars per line can be treated one of two ways: the bar widths can be resized to evenly distribute the bars along the line, or a gap can be left at the right side, preserving the vertical bar line alignment throughout the chart.

One aspect of the present disclosure is the user's ability to view the full chart in either an expanded or condensed form. The expanded form presents the song chronologically its line-by-line entirety, without any repeat symbols. The condensed form compacts the chart to conserve space and reduce the use of repeated aspects of the form. For example, if the verse repeats the same four chords several times, then a compact chart can omit the repeated information, instead just showing where each successive line of lyrics falls in time under the same chord progression. In this instance, where there is little need to repeat those chord symbols, not only would a compact form be more efficient, but the compact chart can often more clearly convey the chord progression and overall song form. Advantageously, as the compact chart reduces the cognitive load, thereby aiding in memorizing the song's chord progression, applications for teaching/learning songs abound.

Further, other embodiments of the present disclosure could include automatic transposition; customizable layouts (portrait/landscape, number of measures per line, extra bar(s) in each line); chord diagrams for fretted string instruments and/or keyboard instruments; tempo- and key-adjustable playback; two- or three-dimensional visualizations of chords, melody, or elements of song form; supplemental content pertaining to musical details and/or social, cultural, historical context.

It is understood that the present disclosure has been described using non-limiting detailed descriptions of aspects thereof that are provided by way of example only and are not intended to limit the scope of the disclosure. Features and/or steps described with respect to one aspect may be used with other aspects and not all aspects of the disclosure have all the features and/or steps shown in a particular figure or described with respect to one of the aspects. Variations of aspects described will occur to persons of skill in the art.

It should be noted that some of the above-described aspects include structure, acts or details of structures and acts that may not be essential to the disclosure, and which are described as examples. Structure and/or acts described herein are replaceable by equivalents that perform the same function, even if the structure or acts are different, as known in the art, e.g., the use of multiple dedicated devices to carry out at least some of the functions described as being carried out by the processor of the present disclosure.

Whereas many alterations and modifications of the disclosure will no doubt become apparent to a person of ordinary skill in the art after having read the foregoing description, it is to be understood that the aspects shown and described by way of illustration are in no way intended to be considered limiting. Further, the subject matter has been described with reference to aspects, but variations within the spirit and scope of the disclosure will occur to those skilled in the art. It is noted that the foregoing examples have been provided merely for the purpose of explanation and are in no way to be construed as limiting of the present disclosure.

Although the present disclosure has been described herein with reference to particular means, materials and aspects, the present disclosure is not intended to be limited to the particulars disclosed herein; rather, the present disclosure extends to all functionally equivalent structures, methods and uses. Various modifications and changes may be made to the disclosed implementations by persons skilled in the art without departing from the scope of the present disclosure.

Computer programs, program modules, and code based on the written description of this specification, such as those used by the microcontrollers, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

Another aspect of the disclosure is directed to a non-transitory computer-readable medium storing instructions which, when executed, cause one or more processors to perform the methods of the disclosure. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

What is claimed is:

1. A method, in a system including a display device and a computer, of creating and presenting a graphic representation of a musical song, the computer comprising a processor and a tangible computer-readable medium storing a plurality of instructions executable by the processor to implement the method, the method comprising:

displaying a first graphical user interface (GUI) on the display device;

receiving, from a user via the first GUI, information about the musical song comprising one or more of: timing signature, tuning, capo position, and performed or sounded key;

displaying the received first information in the first GUI on the display device;

receiving, via a second GUI on the display device, lyrics for the musical song;

displaying, in the second GUI, the received lyrics;

receiving, from the user via the second GUI, metrical timing information for at least one musical measure indicating where a respective portion of the lyrics occurs in each musical measure;

displaying, in the second GUI, a grid comprising at least one row of musical measures, each musical measure showing the respective portion of the lyrics;

receiving from the user, via the second GUI, chord information comprising one or more chords for the song and chord location information identifying where each chord occurs in the song; and displaying each of the one or more chords in the second GUI at the respective location in the musical measures where the chord occurs in the song, whereby the one or more chords are aligned in measured musical time with the song lyrics.

2. The method of claim 1, further comprising:

receiving, from the user via the second GUI, input moving a first chord from a first location with respect to the lyrics to a second location with respect to the lyrics; and displaying, in the second GUI, the first chord at the second location with respect to the lyrics.

3. The method of claim 1, further comprising:

receiving, from the user via the second GUI, input moving a first portion of the lyrics from a first location with respect to the at least one musical measure to a second location with respect to the at least one musical measure; and displaying, in the second GUI, the first portion of the lyrics at the second location with respect to the at least one musical measure.

4. The method of claim 1, further comprising:

displaying, in the second GUI, a first set of lyrics in a first horizontal line; and displaying, in the second GUI, a first set of chords, corresponding to the first set of lyrics, in a second horizontal line positioned above the first horizontal line, wherein a location of each chord in the line corresponds to a location in the lyrics.

5. The method of claim 4, further comprising:

displaying all lyrics and all chords for the musical song in the second GUI.

6. The method of claim 1, further comprising:

receiving, from the user via the second GUI, input moving a first chord from a first location in a first musical measure to a second location in a second musical measure; and displaying, in the second GUI, the first chord at the second location in the second musical measure.

7. The method of claim 1, further comprising:

receiving, from the user via the second GUI, input changing a number of measures in an identified row of musical measures from a first value to a second value; and displaying, in the second GUI, the identified row of musical measures with a number of measures equal to the second value.

8. The method of claim 7, further comprising:

displaying, in the second GUI, at least one other row of musical measures, different than the identified row, with a number of measures equal to the first value.

9. A system for creating and presenting a graphic representation of a musical song, the system comprising:

a display device; and a processor, coupled to the display device, the processor configured to:

display a first graphical user interface (GUI) on the display device;

receive, from a user, via the first GUI, information about the musical song comprising one or more of: timing signature, tuning, capo position, and performed or sounded key;

display the received first information in the first GUI on the display device;

receive, via a second GUI on the display device, lyrics for the musical song;

display, in the second GUI, the received lyrics;

display, in the second GUI, a grid comprising at least one row of musical measures, each musical measure showing the respective portion of the lyrics;

receive from the user, via the second GUI, chord information comprising one or more chords for the song and chord location information identifying where each chord occurs in the song; and display each of the one or more chords in the second GUI at the respective location in the musical measures where the chord occurs in the song, whereby the one or more chords are aligned in measured musical time with the song lyrics.

10. The system of claim 9, wherein the processor is further configured to:

receive, from the user via the second GUI, input moving a first chord from a first location with respect to the lyrics to a second location with respect to the lyrics; and display, in the second GUI, the first chord at the second location with respect to the lyrics.

11. The system of claim 9, wherein the processor is further configured to:

receive, from the user via the second GUI, input moving a first portion of the lyrics from a first location with respect to the at least one musical measure to a second location with respect to the at least one musical measure; and display, in the second GUI, the first portion of the lyrics at the second location with respect to the at least one musical measure.

12. The system of claim 9, wherein the processor is further configured to:

display, in the second GUI, a first set of lyrics in a first horizontal line; and display, in the second GUI, a first set of chords, corresponding to the first set of lyrics, in a second horizontal line positioned above the first horizontal line, wherein a location of each chord in the line corresponds to a location in the lyrics.

13. The system of claim 12, wherein the processor is further configured to:

display all lyrics and all chords for the musical song in the second GUI.

14. The system of claim 9, wherein the processor is further configured to:

receive, from the user via the second GUI, input moving a first chord from a first location in a first musical measure to a second location in a second musical measure; and display, in the second GUI, the first chord at the second location in the second musical measure.

15. A non-transitory tangible computer-readable medium storing instructions thereon that, when executed by a processor within a system comprising the processor and a display device, causes the processor to implement a method of creating and presenting a graphic representation of a musical song, the method comprising:

displaying a first graphical user interface (GUI) on the display device;

receiving, from a user via the first GUI, information about the musical song comprising one or more of: timing signature, tuning, capo position, and performed or sounded key;

displaying the received information in the first GUI on the display device;

receiving, via a second GUI on the display device, lyrics for the musical song;

displaying, in the second GUI, the received lyrics;

receiving, from the user via the second GUI, metrical timing information for at least one musical measure indicating where a respective portion of the lyrics occurs in each musical measure;

displaying, in the second GUI, a grid comprising at least one row of musical measures, each musical measure showing the respective portion of the lyrics;

receiving from the user, via the second GUI, chord information comprising one or more chords for the song and chord location information identifying where each chord occurs in the song; and displaying each of the one or more chords in the second GUI at the respective location in the musical measures where the chord occurs in the song, whereby the one or more chords are aligned in measured musical time with the song lyrics.

16. The non-transitory tangible computer-readable medium of claim 15, wherein the method further comprises:

receiving, from the user via the second GUI, input moving a first chord from a first location with respect to the lyrics to a second location with respect to the lyrics; and displaying, in the second GUI, the first chord at the second location with respect to the lyrics.

17. The non-transitory tangible computer-readable medium of claim 15, wherein the method further comprises:

receiving, from the user via the second GUI, input moving a first portion of the lyrics from a first location with respect to the at least one musical measure to a second location with respect to the at least one musical measure; and displaying, in the second GUI, the first portion of the lyrics at the second location with respect to the at least one musical measure.

18. The non-transitory tangible computer-readable medium of claim 15, wherein the method further comprises:

displaying, in the second GUI, a first set of lyrics in a first horizontal line; and displaying, in the second GUI, a first set of chords, corresponding to the first set of lyrics, in a second horizontal line positioned above the first horizontal line, wherein a location of each chord in the line corresponds to a location in the lyrics.

19. The non-transitory tangible computer-readable medium of claim 18, wherein the method further comprises:

displaying all lyrics and all chords for the musical song in the second GUI.

20. The non-transitory tangible computer-readable medium of claim 15, wherein the method further comprises:

receiving, from the user via the second GUI, input moving a first chord from a first location in a first musical measure to a second location in a second musical measure; and displaying, in the second GUI, the first chord at the second location in the second musical measure.

* * * * *